July 30, 1929.  J. MacGREGOR  1,722,305
DISTRIBUTING DEVICE
Filed March 8, 1926
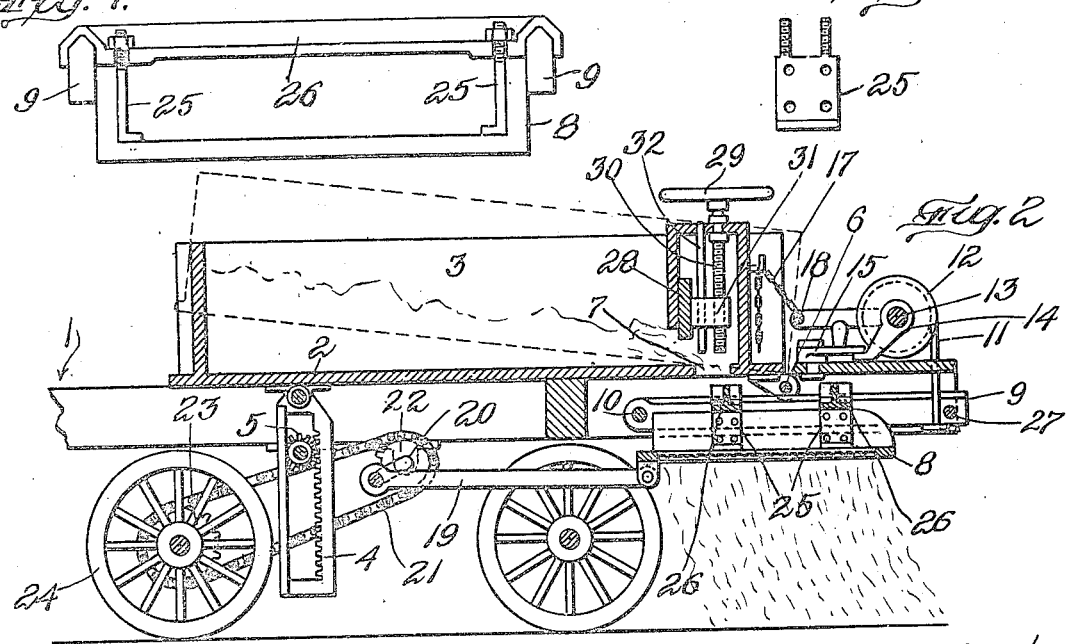
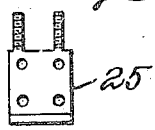
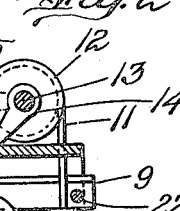
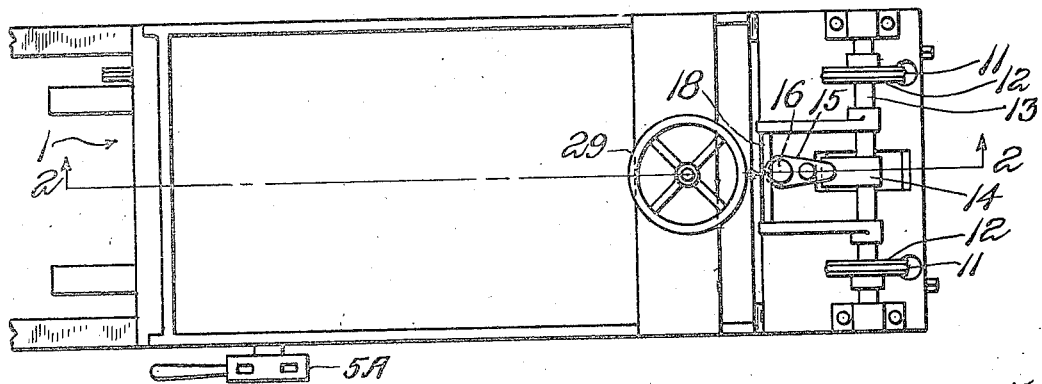
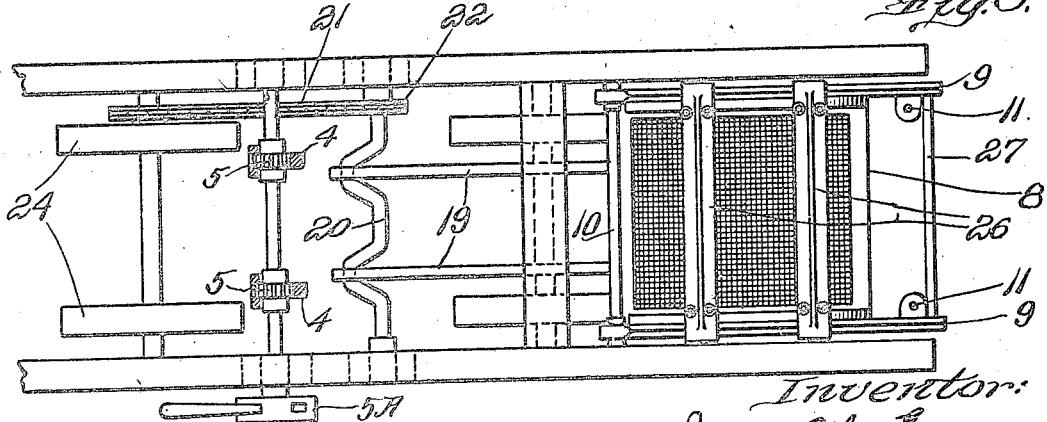
Inventor:
James MacGregor
by George A. Rockwell, atty.

Patented July 30, 1929.

1,722,305

UNITED STATES PATENT OFFICE.

JAMES MacGREGOR, OF BRAINTREE, MASSACHUSETTS.

DISTRIBUTING DEVICE.

Application filed March 8, 1926. Serial No. 93,018.

This application is a continuation in part of my application filed Feb., 17, 1923 Ser. No. 619,705.

The principal object of my invention is to provide rapid and efficient means for distributing a uniform layer of sand, stone screenings, cement, lime phosphate or other material over any desired surface, such as a freshly oiled or tarred highway or a surface upon which fertilizer is to be deposited.

A feature of my invention is a swinging sifter for distributing the material.

Another feature is that the sifter is in advance of the wheels, in case the sifter is mounted on a wheeled vehicle as in the forms shown.

Other features will be pointed out below.

In the drawing:

Figure 1 is a top plan of a device embodying my invention, broken away;

Figure 2 is a section on line 2—2 of Figure 1;

Figure 3 is a plan of the parts below the tops of the side bars of the truck or wagon;

Figure 4 is a front elevation of a portion of the sifter mechanism; and

Figure 5 is a detail of one of the ears hereinafter referred to.

I show a truck or wagon 1 upon which my device is mounted and the truck or wagon may be suitably pushed from the rear. 2 is the bottom of the hopper 3 into which the material is placed one end of which may be elevated by racks 4 and pinions 5, the shaft for the pinions being turned by hand wheel 5A.

To give the proper slope the bottom of the hopper floor 2 is hinged at the front end to the body of the truck, by a rod 6 extending across the end of the hopper.

The hopper floor 2 is cut away near the front end forming a rectangular opening 7 extending across the bottom of the floor 2, and beneath the opening 7 is the sifter 8, which slides on guides 9 hinged at their rear ends to the sides of the truck by a rod 10 extending across beneath the hopper and connected to the sides of the truck. By hinging the sifter guides 9 the sifter or screen may be raised or lowered at the front end to permit adjustment of the distribution and to prevent friction and clogging of the sifter.

I have the sifter guides 9 suspended by wire straps 11 to partly encircle rolls 12 which turn on an axle 13 and on the axle is an arm 14. I provide a latch 15 pivoted to the floor at 16 to overlap the arm 14 which will hold the sifter in one course for sifting, as shown by Figure 2. For a second course of sifting at another slope the latch can be turned to the right or left by foot out of engagement with the arm to free the rolls to which the sifter is suspended so that the rolls may turn and the sifter can be adjusted to any slope at the will of the operator and held fast by a chain 17 which is attached to a handle bar 18, the latter being rigidly connected with the axle 13.

Attached to the rear end of the sifter or screen 8 are two connecting rods 19 operated by the crank shaft 20, which is in turn revolved by the chain 21 driven by the sprocket wheel 22 by means of the sprocket wheel 23, which derives its power from the axle of the rear wheels 24.

I have the sifter on guide rails which are pivoted on the rod 10.

An advantage of my invention is that the material flows from the hopper into the sifter with little or no change to clog up the sifter and this I accomplish by the means I have provided for lowering and raising.

I have suspended the sifter by ears 25 attached to the sides and bottom of the sifter 8. The ears are also attached to stay bars or rods 26 extending across the top of the sifter, said stay bars fitting into the ears which are screw threaded for reception of screw nuts to hold them solid. At each end of the stay bars or rods 26 is a wedge shaped groove which fits the top of the guide rails 9 on which the shifter slides. Extending across the front end of the sifter is a collared rod 27 to keep the guide rails separated and also at the rear end of the sifter extends the pivot rod 10, which is provided with collars to space the guide rails and also is used to hinge the guide rails to the truck.

A supply gate 28 forms an end to the hopper 4 and is to regulate the rate at which the material flows from the hopper to the screen or sifter 8. I provide the following means for controlling the supply at the opening 7 in the bottom of the hopper. For the operator there is a hand wheel 29 having a threaded shaft 30 which threads into a fixture 31, which is attached to the slide or gate 28, which regulates the flow of material that flows from the hopper through the opening 7 into the sifter 8 and is sifted and falls to the ground. For the supply gate or slide I provide guides 32 to prevent binding or friction.

The lowering and raising of supply gate or slide 28 can be regulated by the hand wheel 29, Figures 1 and 2.

At the lower end of the hopper are guide bars spaced apart to receive and guide the supply gate which is in effect the front end of the hopper as well as being the supply gate.

It is to be observed that any size mesh can be placed in the screen 8 so that the device may be readily adapted to distribute coarse or fine material.

In using my device the screen may be raised or lowered to the desired position and there held to distribute the material, the two connecting rods preventing sidewise tilting of the screen during the raising or lowering. The screen extends clear across and in front of the wheels and thereby distributes the sand or other material so that the wheels will not come in contact with tar or oil, for example, that might be on the road.

What I claim is:

1. A device of the character described comprising a vehicle having a body; tracks mounted on said body; a screen mounted to reciprocate on said tracks; two connecting rods connected to said screen to reciprocate the same and one being located at one side of the centre line of the screen which line extends in the direction of movement of the screen and the other being located at the other side of said line and both rods being in substantially the same plane at any given time to prevent tilting of the screen; a crank shaft operating said connecting rods; and means to rotate the crank shaft; and means to hold the tracks in the desired position of inclination with relation to the horizontal.

2. A device of the character described comprising two pivoted parallel rails; a screen mounted to reciprocate on said rails; a roll above said rails; fixed bearings for said roll; flexible straps adapted to be wound on said roll and each having fixed connection at one end with the roll and one strap having fixed connection at the other end with one of said rails at a distance from the pivot of that rail and the other strap having fixed connection at its other end with the other of said rails at substantially the same distance from the pivot of said other rail, rotation of said roll acting to wind or unwind said straps and thereby change the angle of inclination of said rails; and means to hold the roll in the desired position and thereby hold the rails in the desired position of inclination with relation to the horizontal.

3. A device of the character described comprising two pivoted parallel rails; a screen mounted to reciprocate on said rails; a roll above said rails; fixed bearings for said roll; flexible straps adapted to be wound on said roll and each having fixed connection at one end with the roll and one strap having fixed connection at the other end with one of said rails at a distance from the pivot of that rail and the other strap having fixed connection at its other end with the other of said rails at substantially the same distance from the pivot of said other rail; and a member rigidly connected with said roll to rotate the latter and thereby change the angle of inclination of said rails; and means to hold the roll in the desired position and thereby hold the rails in the desired position of inclination with relation to the horizontal.

4. A device of the character described comprising a hopper having an outlet; tracks pivoted at their ends, each track being, at its top, in the form of a very narrow edge and being bevelled downwardly and outwardly from both sides of said edge; a screen member mounted on said tracks beneath said outlet to receive the material from said outlet, said screen member having a downwardly-facing groove at each side, said track edges being within said grooves and the bevelled portions of the tracks cooperating with said grooves to prevent sidewise movement of the screen; means to reciprocate positively the screen on said tracks beneath said outlet and thereby distribute the material, said tracks being movable to place the screen in the inclined position desired for reciprocation of the screen; and means to hold the tracks in the desired position of inclination with relation to the horizontal.

JAMES MacGREGOR.